United States Patent [19]

Ichihashi et al.

[11] Patent Number: 4,917,228
[45] Date of Patent: Apr. 17, 1990

[54] METHOD OF SORTING VEHICLE BODIES BY THE COLORS OF COATING EXPECTED THEREON IN A VEHICLE BODY COATING LINE

[75] Inventors: Eishun Ichihashi; Sigetaka Tooka, both of Hiroshima; Keisi Tanaka, Higashihiroshima, all of Japan

[73] Assignee: Mazda Motor Corporation, Tokyo, Japan

[21] Appl. No.: 186,095

[22] Filed: Apr. 25, 1988

Related U.S. Application Data

[62] Division of Ser. No. 13,126, Feb. 10, 1987, Pat. No. 4,770,122.

[30] Foreign Application Priority Data

Feb. 13, 1986 [JP] Japan .................................. 61-29371

[51] Int. Cl.⁴ .............................................. B65G 37/00
[52] U.S. Cl. ...................................... 198/347; 104/88; 198/350; 198/356; 118/697
[58] Field of Search ............... 198/356, 358, 349, 350, 198/347; 104/88; 118/696, 697, 698, 686, 687, 313, 320, 321, 326

[56] References Cited

U.S. PATENT DOCUMENTS

| | | | |
|---|---|---|---|
| 2,728,466 | 12/1955 | Postlewaite et al. | 198/358 X |
| 3,122,231 | 2/1964 | Pence et al. | 198/358 X |
| 3,937,335 | 2/1976 | Lanham et al. | 198/358 X |
| 4,382,516 | 5/1983 | Inazaki et al. | 198/347 X |
| 4,667,621 | 5/1987 | Kusunoki et al. | 198/358 X |
| 4,770,122 | 9/1988 | Ichihashi et al. | 198/349 X |

Primary Examiner—Frank E. Werner
Assistant Examiner—D. Glenn Dayoan
Attorney, Agent, or Firm—Sixbey, Friedman, Leedom & Ferguson

[57] ABSTRACT

An arrangement for sorting vehicle bodies by the colors of coating expected on the vehicle bodies in a vehicle body coating line, comprises vehicle body conveying equipment including a plurality of branch conveyers disposed in parallel with one another for transporting and storing temporarily vehicle bodies carried into the arrangement through a bringing-in conveyer and supplying the vehicle bodies stored temporarily to a coating process through a bringing-out conveyer, and a control device for storing data indicative of color of coating expected on each of the vehicle bodies on said branch conveyers, with reference to a position of each of the vehicle bodies on the branch conveyers, and driving each of the branch conveyers selectively in accordance with the data stored so as to transport the vehicle bodies on the branch conveyers to the bringing-out conveyer in such a manner that the vehicle bodies from the branch conveyers are sorted in dependence on the colors of coating expected on the vehicle bodies.

17 Claims, 4 Drawing Sheets

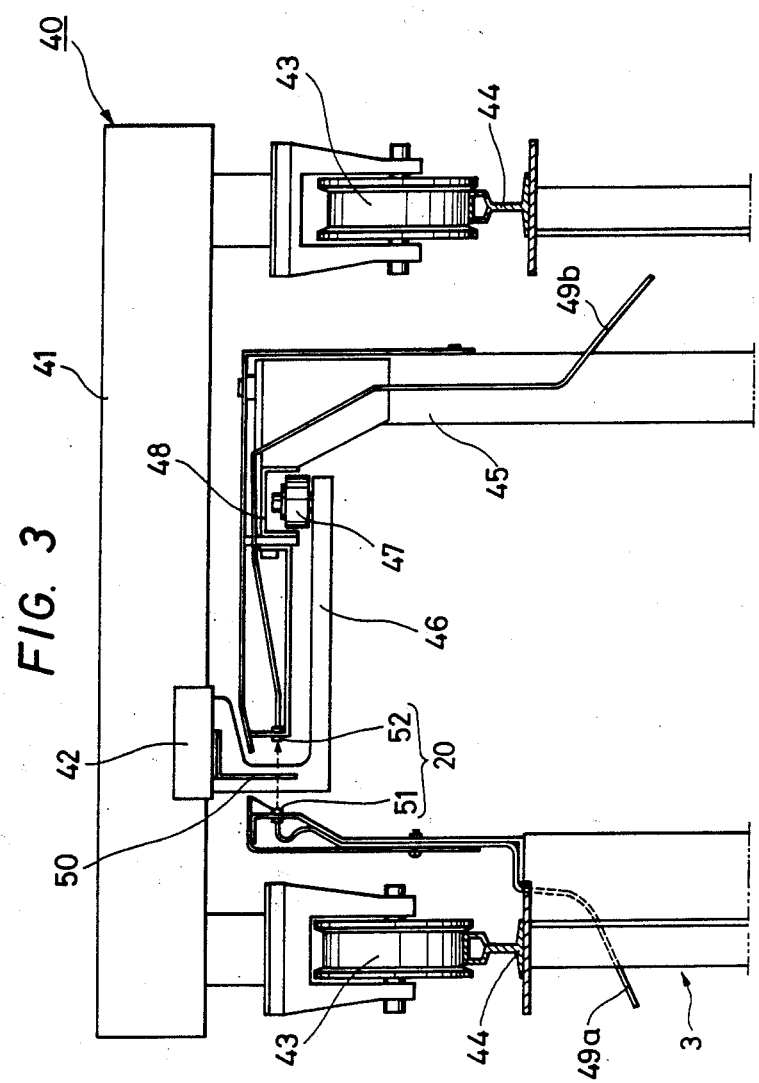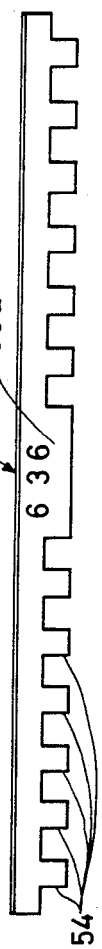

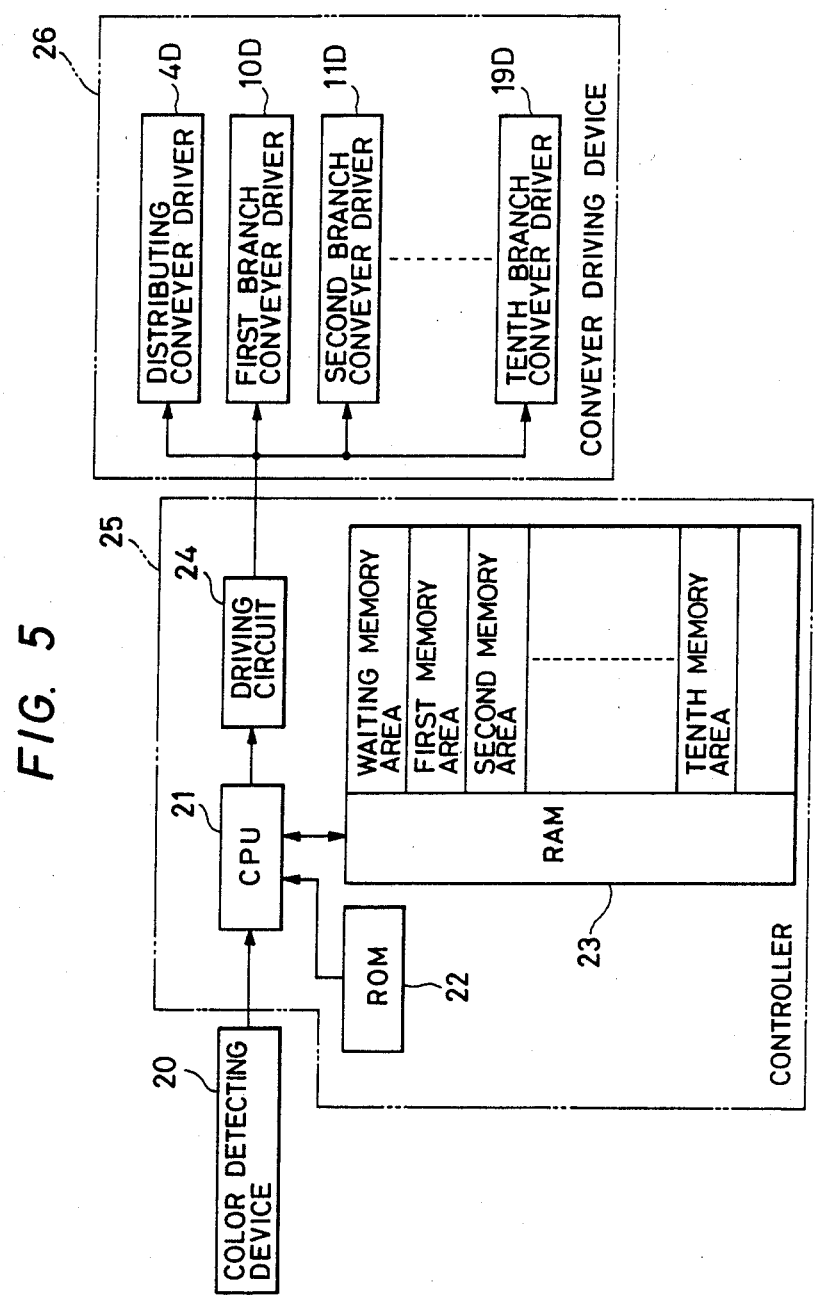

METHOD OF SORTING VEHICLE BODIES BY THE COLORS OF COATING EXPECTED THEREON IN A VEHICLE BODY COATING LINE

This is a divisional of Ser. No. 013,126 filed Feb. 10, 1987 now U.S. Pat. No. 4,770,122.

BACKGROUND OF THE INVENTION

1. Field of the Invention

The present invention relates generally to arrangements for sorting vehicle bodies by the colors of coating expected thereon in a vehicle body coating line, and more particularly, is directed to an arrangement Provided in a vehicle body coating line for storing temporarily vehicle bodies therein and supplying successively the vehicle bodies temporarily stored to a coating process in the vehicle body coating line in such a manner that the vehicle bodies are sorted in dependence on the colors of coating expected thereon. 2. Description of the Prior Art In an automobile production plant, uncolored vehicle bodies obtained from a body assembly line are transported successively to a vehicle body coating line including a undercoating process and second and final coating processes to be coated therein, and each of coated vehicle bodies obtained from the vehicle body coating line is further transported to a vehicle assembly line in which the coated vehicle body is provided with various parts or appliances. There has been proposed a vehicle body production system in which a plurality of vehicle bodies of various types, grades or colors are supplied to a common vehicle body coating line to be provided with respective coatings. In such a system, the manner of supplying the vehicle bodies to the vehicle body coating line is so controlled that work amount at each of working stages provided in the vehicle body assembly line is well-balanced, in consideration of the types and grades of the vehicle bodies. Since the vehicle bodies supplied to the vehicle body coating line are to be provided with respective coatings of different colors, a change of color in a coating process provided in the vehicle body coating line is carried out in such a manner that a worker detects color of coating expected on each of the vehicle bodies conveyed thereinto and makes arrangements for supplying a selected paint corresponding to detected color to a paint spraying device provided for coating the vehicle bodies from one of paint tanks, which contains the selected paint, as disclosed in, for example, the Japanese patent application published before examination under publication number 54-72243.

In the previously proposed vehicle body production system as mentioned above, however, since the vehicle bodies are supplied to the vehicle body coating line without consideration of the colors of coating expected on the vehicle bodies, it is required to carry out frequently the change of color in the coating process provided in the vehicle body coating line, and such frequent changes of color in the coating process bring about waste of paints and increase of work amount in the coating process, so that the productivity of vehicle bodies is reduced. Further, the frequent changes of color at the stage of coating process result in a disadvantage that, in case of two successive coating operations by which vehicle bodies are coated in respective different colors, mist of paint produced in the preceding coating operation is apt to have a harmful influence upon the following coating operation and therefore the coating of the vehicle body colored by the following coating operation is deteriorated in color quality.

OBJECTS AND SUMMARY OF THE INVENTION

Accordingly, it is an object of the present invention to provide an arrangement for sorting vehicle bodies by the colors of coating expected thereon in a vehicle body coating line, which avoids the foregoing problems encountered with the prior art.

Another object of the present invention is to provide an arrangement for sorting vehicle bodies by the colors of coating expected thereon in a vehicle body coating line, through which vehicle bodies are supplied to a coating process provided in the vehicle body coating line in such a manner that the frequency of changes of color in the coating process is effectively reduced.

A further object of the present invention is to provide an arrangement for sorting vehicle bodies by the colors of coating expected thereon in a vehicle body coating line, which stores temporarily vehicle bodies therein and supplies the same to a coating process provided in the vehicle body coating line in such a manner that the vehicle bodies are sorted in dependence on the colors of coating expected thereon.

According to the present invention, there is provided an arrangement for sorting vehicle bodies by the colors of coating expected thereon in a vehicle body coating line, the arrangement comprising a vehicle body conveying equipment including a bringing-in conveyer for carrying vehicle bodies into the arrangement, a plurality of branch conveyers disposed in parallel with one another for transporting and storing temporarily the vehicle bodies carried into the arrangement by the bringing-in conveyer and distributed thereto, and a bringing-out conveyer for supplying the vehicle bodies transported thereto from the branch conveyers to a coating process provided in the vehicle body coating line, and a control device for storing therein data which are obtained based on an information supplied thereto and representing color of coating expected on each of the vehicle bodies carried into the arrangement by the bringing-in conveyer and are indicative of color of coating expected on each of the vehicle bodies stored temporarily on the branch conveyers, with reference to a position of each of the vehicle bodies on the branch conveyers, and for driving each of the branch conveyers selectively in accordance with the data stored therein so as to transport the vehicle bodies stored temporarily on the branch conveyers to the bringing-out conveyer in such a manner that the vehicle bodies from the branch conveyers are sorted in dependence on the colors of coating expected thereon.

In the arrangement thus constituted in accordance with the present invention, the control device which is supplied with the information representing the color of coating expected on each of vehicle bodies carried into the arrangement by the bringing-in conveyer and distributed to the branch conveyers, is operative to produce the data indicative of the color of coating expected on each of vehicle bodies on the branch conveyers based on the information supplied thereto and store the same with reference to the position of each of the vehicle bodies on the branch conveyers, determine the order of the vehicle bodies to be supplied to the coating process in accordance with the data stored therein in such a manner as sorted in dependence on the color of coating expected thereon, and control the vehicle body conveying equipment so as to cause each of the branch conveyers to operate selectively for supplying the vehicle bodies on the branch conveyers through the bringing-out conveyer to the coating process in the order determined. Consequently, a plurality of vehicle bodies which are to be coated in the same color are supplied in a group successively to the coating process.

Accordingly, with the arrangement according to the present invention, the frequency of changes of color in the coating process is effectively reduced. This results in reduced waste of paints and decrease in work amount in the coating process, so that the productivity of vehicle bodies is improved. Further, the frequency of situations in each of which mist of paint produced in the preceding one of a couple of successive coating operations by which two vehicle bodies are coated in different colors, respectively, has a harmful influence upon the following one of the couple of successive coating operations, is reduced, and therefore the coating of each of the vehicle bodies is improved in color quality.

The above, and other objects, features and advantages of the present invention will become apparent from the following detailed description which is to be read in conjunction with the accompanying drawings.

BRIEF DESCRIPTION OF THE DRAWINGS

FIG. 3 is a schematic side view showing a portion including one example of a color detecting device of the embodiment shown in FIG. 2;

FIG. 4 is a schematic front view showing a part of the color detecting device shown in FIG. 3;

FIG. 5 is a schematic block diagram showing one example of a control system employed in the embodiment shown in FIG. 2;

DESCRIPTION OF THE PREFERRED EMBODIMENTS

First, one example of a vehicle body coating line to which an embodiment of the present invention is applied will be explained with reference to FIG. 1.

Figure 1:
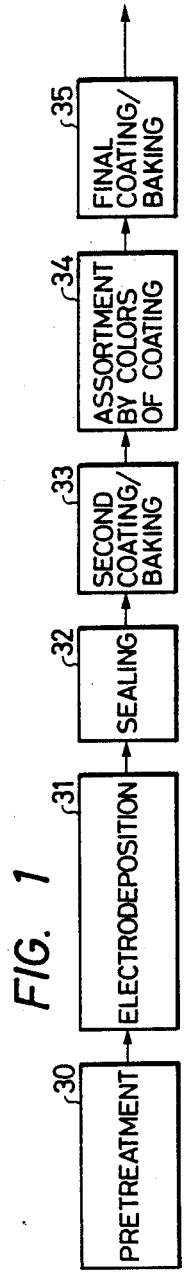
FIG. 1 is a block diagram showing a series of various principal processes in a vehicle body coating line to which an embodiment of the present invention is applied.

Referring to FIG. 1, this example of the vehicle body coating line includes a pretreatment process 30, an electrodeposition process 31, a sealing process 32, a second coating and baking process 33, a process 34 of assortment by colors of coating, and a final coating and baking process 35, as a series of principal processes. In the pretreatment process 30 to which uncolored vehicle bodies obtained from a body assembly line are supplied successively, each of the uncolored vehicle bodies is subjected to degreasing and then provided on the surface thereof with a layer of inorganic substance which is chemically stable. The vehicle bodies having passed through the pretreatment process 30 are undercoated by means of electrodeposition in the electrodeposition process 31 and sealed up in the sealing process 32. Then, each of the vehicle bodies is provided with a second coating and subjected to baking in the second coating and baking process 33. The vehicle bodies provided with the second coating are supplied to the process 34 of assortment by colors of coating, to which one embodiment of arrangement for sorting vehicle bodies by the colors of coating expected thereon according to the present invention is applied.

In the process 34 of assortment by colors of coating, the vehicle bodies provided with the second coating are stored temporarily and then sorted in dependence on the colors of final coating expected thereon on the occasion of being supplied to the final coating and baking process 35. Each of the vehicle bodies supplied to the final coating and baking process 35 from the process 34 of assortment by colors of coating is provided with a final coating covering up the second coating to be colored thereby and subjected to baking in the final coating and baking process 35.

The vehicle bodies thus provided with the respective final coatings leave the vehicle body coating line successively for a vehicle assembly line in which each of the vehicle bodies is provided with various parts and appliances.

Figure 2:
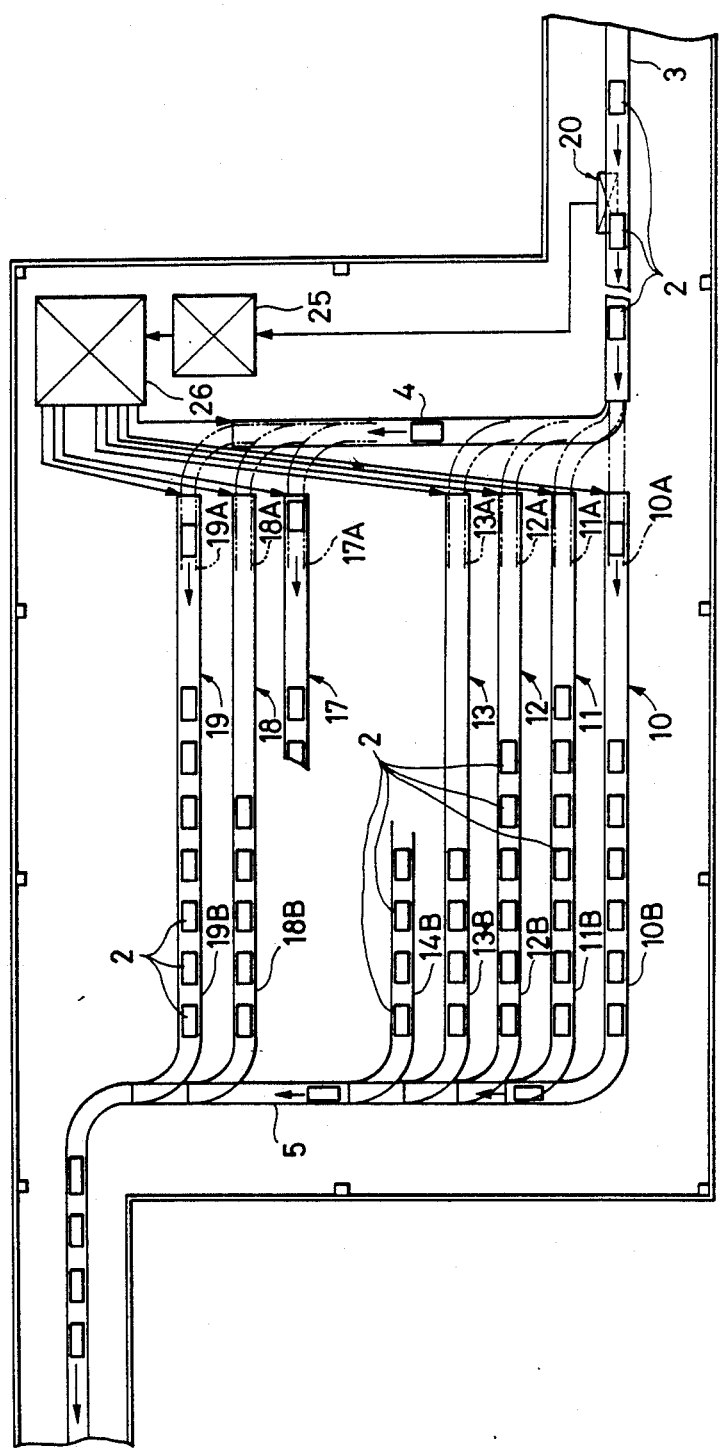
FIG. 2 is a schematic plane view showing one embodiment of arrangement for sorting vehicle bodies by the colors of coating expected thereon in a vehicle body coating line according to the present invention.

FIG. 2 shows schematically the embodiment of arrangement for sorting vehicle bodies by the colors of coating expected thereon according to the present invention which is applied to the process 34 of assortment by colors of coating in the above described vehicle body coating line.

Now, referring to FIG. 2, the embodiment is provided with a vehicle body conveying equipment including a bringing-in conveyer 3 for carrying vehicle bodies 2 obtained from the second coating and baking process 33 into the arrangement, a distributing conveyer 4 coupled with the bringing-in conveyer 3, a plurality of branch conveyers 10 to 19 each having its input end portion engaged with the distributing conveyer 4, and a bringing-out conveyer 5 which is engaged with each of the output end portions of the branch conveyers 10 to 19 to receive the vehicle bodies 2 from each of the branch conveyers 10 to 19 and supply the same to the final coating and baking process 35.

The vehicle bodies 2 carried into the arrangement by the bringing-in conveyer 3 are transferred successively to the distributing conveyer 4 and then distributed selectively to each of the branch conveyers 10 to 19. Each of the bringing-in conveyer 3 and the distributing conveyer 4 is installed on a floor with, for example, a plurality of carriages on which the vehicle bodies 2 are respectively placed.

The branch conveyers 10 to 19 comprise trolly conveyers 10A to 19A of the overhead type and car type conveyers 10B to 19B installed on the floor, respectively. Each of the car type conveyers 10B to 19B is arranged to be able to receive, for example, ten vehicle bodies 2 in series thereon and transport simultaneously ten vehicle bodies 2 toward the lower course thereof. The trolly conveyers 10A to 19A have their respective first ends elongated to positions corresponding respectively to the locations on the car type conveyers 10B to 19B each distant from the input end of each of the car type conveyers 10B to 19B with a space therebetween in which two vehicle bodies 2 can be placed in series, and their respective second ends which are opposite to the respective first ends and elongated respectively to positions over the distributing conveyer 4, so as to transfer the vehicle bodies 2 from the distributing conveyer 4 to the car type conveyers 10B to 19B. On the car type conveyers 10B to 19B, the vehicle bodies 2 are stored temporarily to form ten lines (lines 1 to 10) elongating along the car type conveyers 10B to 19B, respectively, and ten columns (columns 1 to 10) each elongating across the car type conveyers 10B to 19B.

The distributing conveyer 4 and the branch conveyers 10 to 19 including respectively the trolly conveyers 10A to 19A and the car type conveyers 10B to 19B are independently driven to operate by a conveyer driving device 26 which is controlled in its operation by a controller 25. With the operations of the distributing conveyer 4 and each of the branch conveyers 10 to 19 thus controlled selectively through the conveyer driving device 26 by the controller 25, the vehicle bodies 2 at the output end portion of the distributing conveyer 4 are transferred through the trolly conveyers 10A to 19A to the input end portions of the car type conveyers 10B to 19B, the vehicle bodies 2 transferred to the input end portions of the car type conveyers 10B to 19B are transported and stored temporarily on the car type conveyers 10B to 19B, and the vehicle bodies 2 at the output end portions of the car type conveyers 10B to 19B are transferred to the bringing-out conveyer 5.

Further, a color detecting device 20 is provided in relation to the bringing-in conveyer 3 for detecting color of coating expected on each of the vehicle bodies 2 transported by the bringing-in conveyer 3, and a detection output signal of the color detecting device 20 is supplied to the controller 25. The color detecting device 20 is arranged, for example, to read a bar-code indication or indication of numbers corresponding to color and attached to each of the vehicle bodies 2 or each of carriages provided on the bringing-in conveyer 3 for supporting the vehicle bodies 2.

FIGS. 3 and 4 show a photodetecting system embodying the color detecting device 20, which is operative to read indications of numbers corresponding to colors and attached to carriages on the bringing-in conveyer 3.

Referring to FIG. 3, a carriage 40 comprises a supporting table 41 on which the vehicle body 2 is placed and a plurality of wheels 43 attached to the under surface of the supporting table 41. The wheels 43 is engaged with rails 44 which are laid to form the bringing-in conveyer 3 so as to run along the rails 44. A supporting member 45 is fixed between the rails 44 and a guide rail 48 forming a groove looking down is supported by the supporting member 45 to elongate along the rails 44.

A guide arm 46 is mounted on the under surface of the supporting table 41. The end portion of the guide arm 46 elongating from the under surface of the supporting table 41 is provided with a roller 47 which is engaged with the guide rail 48 supported by the supporting member 45, so that the carriage 40 can be moved freely along the rails 44 under the guidance by the guide rail 48.

A mounting braket 42 is provided in the vicinity of the guide arm 46 on the under surface of the supporting table 41, and a coded plate 50 is mounted on the mounting braket 42. As shown in FIG. 4, the coded plate 50 is provided with a plurality of teeth 54 in a flat portion 50a thereof extending downward from the mounting braket 42. The teeth 54 are arranged to indicate a binary code representing an identification number 636 given to the carriage 40 in this example. The identification number corresponds to color of coating expected on one of the vehicle bodies 2 placed on the supporting table 41.

In relation to a path for the coded plate 50 moved together with the carriage 40, an optical reading device composed of a light emitting element 51, such as a light emitting diode, which is supplied with driving power through a lead line 49a and a photodetecting element 52, such as a phototransistor, which is supplied with driving power through a lead line 49b, is disposed between the rails 44. The light emitting element 51 and the photodetecting element 52 are face each other with the path for the coded plate 50 between so as to detect the teeth 54 provided on the coded plate 50 when the coded plate 50 passes through the path between the light emitting element 51 and the photodetecting element 52. That is, the optical reading device composed of the light emitting element 51 and the photodetecting element 52 is operative to read the identification number corresponding to the color of coating expected on one of the vehicle bodies 2 placed on the supporting table 41 and a read out signal is obtained from the photodetecting element 52 to be derived through the lead line 49b.

As described above, the optical reading device composed of the light emitting element 51 and the photodetecting element 52 constitutes one embodiment of the color detecting device 20, and the detection output signal thereof, which is the read out signal obtained from the photodetecting element 52, is supplied through the lead line 49b to the controller 25.

FIG. 5 shows an example of a control system for controlling the operations of the distributing conveyer 4 and the branch conveyers 10 to 19. This control system includes the color detecting device 20, the controller 25 and the conveyer driving device 26. The controller 25 comprises a central processing unit (CPU) 21 to which the detection output signal of the color detecting device 20 is supplied, a read only memory (ROM) 22 in which a basic control program is stored, a random access memory (RAM) 23 in which a waiting memory area and first to tenth memory areas are partitioned, and a driving circuit 24 which is connected to the conveyer driving device 26 and controlled by the CPU 21. The conveyer driving device 26 includes a distributing conveyer driver 4D for driving the distributing conveyer 4 and first and tenth branch conveyer drivers 10D to 19D for driving the branch conveyers 10 to 19, respectively.

Figure 6:
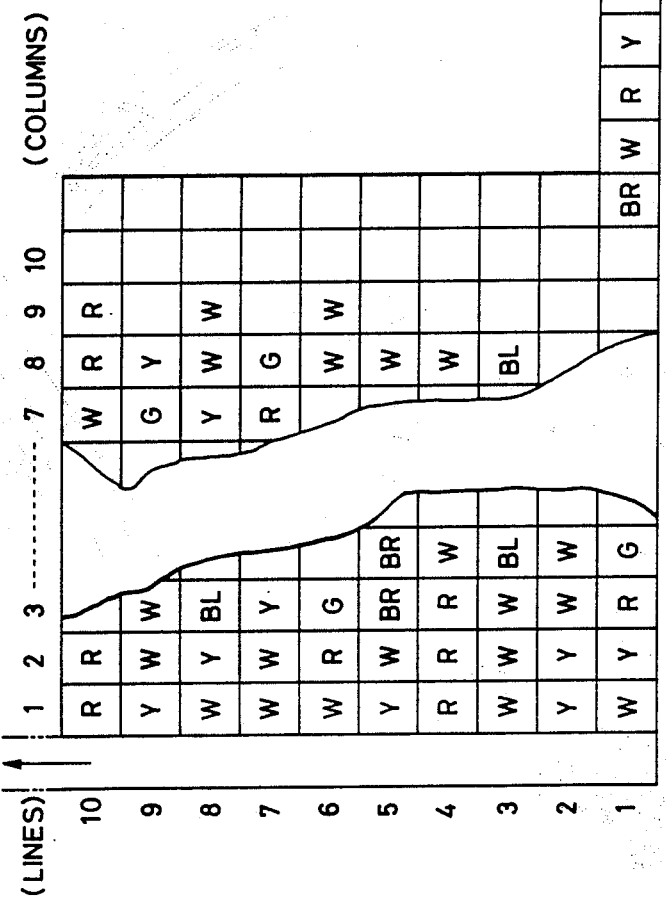
FIG. 6 is a schematic illustration used for explaining the operation of the embodiment shown in FIG. 2.

In the controller 25, the CPU 21 produces data indicative of the color of coating expected on each of the vehicle bodies 2 on the bringing-in conveyer 3 and the branch conveyers 10 to 19 based on the detection output signal of the color detecting device 20 supplied thereto and stores the same selectively in the waiting memory area and the first to tenth memory areas provided in the RAM 23 with reference to the position of each of the vehicle bodies 2 on the bringing-in conveyer 3 and the branch conveyers 10 to 19. FIG. 6 illustrates a conceptual model showing the data stored in the waiting memory area and the first to tenth memory areas of the RAM 23, by way of example. In FIG. 6, capital letters G, R, Y, W, BL and BR represent respectively the data indicative of green, red, yellow, white, black and brown as colors of coating. In the waiting memory area of the RAM 23, data of the colors of coating and the positions concerning the vehicle bodies 2 on the bringing-in conveyer 3 are stored and these data are renewed whenever one of the vehicle bodies 2 on the bringing-in conveyer 3 is transferred to the distributing conveyer 4. In the first memory area of the RAM 23, data of the colors of coating, the positions and the turns of carrying-in concerning the vehicle bodies 2 on the car type conveyer 10B are stored and these data are also renewed whenever any change in number or positions of the vehicle bodies 2 on the car type conveyer 10B arises. Further, in each of the second to tenth memory areas of the RAM 23, data of the colors of coating, the positions and the turns of carrying-in concerning the vehicle bodies 2 on each of the car type conveyers 10B to 19B are stored and renewed in the same manner as the first memory area.

With the control system thus constituted, a first assortment of the vehicle bodies 2 by the colors of coating expected thereon is performed when each of the vehicle bodies 2 on the bringing-in conveyer 3 is distributed to the branch conveyers 10 to 19 by the distributing conveyer 4 and a second assortment of the vehicle bodies 2 by the color of coating expected thereon is performed when each of the vehicle bodies 2 on the branch conveyers 10 to 19 is supplied to the bringing-out conveyer 5, under the control by the controller 25 in accordance with the control program stored in the ROM 22.

In the first assortment of the vehicle bodies 2 by the color of coating expected thereon, each of the vehicle bodies 2 newly transferred to the car type conveyers 10B to 19B through the trolly conveyers 10A to 19A from the distributing conveyer 4 is intended to be positioned at such a location on one of the car type conveyers 10B to 19B as to follow one of the vehicle bodies 2 which is to be coated in the same color and positioned previously in one of the columns 1 to 10, so that a plurality of vehicle bodies 2 which are to be coated in the same color make a group in one of the columns 1 to 10. In the case where the vehicle body 2 newly transferred to the car type conveyers 10B to 19B is not permitted to join such a group in one of the columns 1 to 10, it is positioned at such a location on one of the car type conveyers 10B to 19B as to follow one of the vehicle bodies 2 which is to be coated in the same color and positioned previously on one of the lines 1 to 10, so that a plurality of vehicle bodies 2 which are to be coated in the same color make a group on one of the lines 1 to 10. The data of the colors of coating and the positions concerning the vehicle bodies 2 on the bringing-in conveyer 3 stored in the waiting memory area in the RAM 23 are used to facilitate the first assortment of the vehicle bodies 2 performed as described above.

Then, in the second assortment of the vehicle bodies 2 by the colors of coating expected thereon, on the occasion of movement of each of the vehicle bodies 2 from the car type conveyers 10B to 19B to the bringing-out conveyer 5, first, a group of vehicle bodies 2 which are to be coated in the same color and positioned to make the column 1 on the car type conveyers 10B to 19B are supplied successively to the bringing-out conveyer 5, and then another group of vehicle bodies 2 which are also to be coated in the same color and positioned to make the column 2 on the car type conveyers 10B to 19B to be transferable therefrom are further supplied successively to the bringing-out conveyer 5. The supply of the vehicle bodies 2 to the bringing-out conveyer 5 conducted in this manner is repeated. The vehicle bodies 2 in each group are supplied to the bringing-out conveyer 5 in sequence of their turn of carrying-in.

In the case of the example of FIG. 6, first, five vehicle bodies 2 positioned on lines 1, 3 and 6 to 8 in column 1, which are to be coated in white, are supplied successively to the bringing-out conveyer 5, and then two vehicle bodies 2 positioned on lines 3 and 7 in column 2, which are also to be coated in white, are successively supplied to the bringing-out conveyer 5, so that seven vehicle bodies 2 which are to be coated in white are sorted to be supplied to the coating process in a group. After that, three vehicle bodies 2 positioned on lines 2, 5 and 9 in column 1, which are to be coated in yellow, are supplied successively to the bringing-out conveyer 5, and then three vehicle bodies 2 positioned on lines 1, 2 and 8 in column 2, which are also to be coated in yellow, are successively supplied to the bringing-out conveyer 5, so that six vehicle bodies 2 which are to be coated in yellow are sorted to be supplied to the coating process in a group.

Such first and second assortments of the vehicle bodies 2 as described above are achieved by the following operations of the controller 25 and the conveyer driving device 26.

In the controller 25, the CPU 21 takes in the data stored in the waiting memory area and the first to tenth memory areas of the RAM 23 and makes a computation of those data in accordance with the control program stored in the ROM 22, so as to select one of the branch conveyers 10 to 19 to which the foremost one of the vehicle bodies 2 on the bringing-in conveyer 3 should be distributed. Then, the CPU 21 supplies the distributing conveyer driver 4D and one of the first to tenth branch conveyer drivers 10D to 19D which drives the selected one of the branch conveyers 10 to 19 with respective driving signals, so as to cause the distributing conveyer 4 and that selected one of branch conveyers 10 to 19 to operate. As a result the foremost one of the vehicle bodies 2 on the bringing-in conveyer 3 is distributed on one of the car type conveyers 10B to 19B belonging to the selected one of the branch conveyers 10 to 19 to be positioned in the column 9 or 10. With this distribution of the vehicle body 2, changes arise in the data of the colors of coating and the positions concerning the vehicle bodies 2 on the bringing-in conveyer 3 and the car type conveyers 10B to 19B and therefore the data stored in the waiting memory area and the first to tenth memory areas in the RAM 23 are respectively renewed.

The CPU 21 in the controller 25 operates to cause such vehicle body distributing operations repeatedly for each of the vehicle bodies 2 conveyed into the arrangement by the bringing-in conveyer 3, so that the vehicle bodies 2 from the bringing-in conveyer 3 are positioned in the column 9 or 10 on the car type conveyers 10B to 19B to be sorted in dependence on the colors of coating expected thereon.

Simultaneously with this, the CPU 21 in the controller 25 makes another computation of the data stored in the first to tenth memory areas of the RAM 23 in accordance with the control program stored in the ROM 22 so as to select a group of vehicle bodies on the car type conveyers 10B to 19B, which should be supplied to the bringing-out conveyer 5 to be coated in the same color, and determine the order of the vehicle bodies 2 in the selected group to be supplied to the bringing-out conveyer 5. Then, the CPU 21 supplies the first to tenth branch conveyer drivers 10D to 19D selectively with respective driving signals so as to cause each of branch conveyers 10 to 19 to operate successively. As a result, each of the vehicle bodies 2 in the selected group is supplied to the bringing-out conveyer 5 in the order determined. With this supply of the vehicle body 2, changes arise in the data of the colors of coating and the positions concerning the vehicle bodies 2 on the car type conveyers 10B to 19B and therefore the data stored in the first to tenth memory areas in the RAM 23 are respectively renewed.

The CPU 21 operates to cause such vehicle body supplYing operations repeatedly for each group of vehicle bodies 2 on the car type conveyers 10B to 19B, so that the vehicle bodies 2 stored temporarity on the car type conveyers 10B to 19B are supplied successively to the coating process through the bringing-out conveyer 5 so as to be sorted in dependence on the colors of coating expected thereon. In such case, the vehicle bodies 2 in each group are supplied to the bringing-out conveyer 5 in sequence of their turn of carrying-in.

As apparent from the above description, with the embodiment shown in FIG. 2, the vehicle bodies 2 are substantially sorted into a plurality of groups of vehicle bodies 2 which are to be coated in the same color and each group of vehicle bodies 2 are supplied successively to the coating process, and therefore the frequency of changes of color in the coating process is effectively reduced.

Although the first and second assortments of the vehicle bodies 2 by the colors of coating expected thereon are performed in the embodiment described above, the first assortment of the vehicle bodies 2 is omissible. In case of omission of the first assortment of the vehicle bodies 2, the vehicle bodies 2 from the bringing-in conveyer 3 are positioned in the column 9 or 10 on the car type conveyers 10B to 19B successively in sequence of carrying-in and then the second assortment of the vehicle bodies 2 is performed in the same manner as above mentioned.

Further, although the color detecting device 20 is provided in the embodiment shown in FIG. 2, it is possible to eliminate the color detecting device 20, and instead to arrange so that an information of color of coating expected on each of the vehicle bodies 2 transported by the bringing-in conveyer 3 is supplied to the controller 25 by a worker who confirms the color of coating or through a computer at the outside in which a programmed information for color of coating is stored.

Incidentally, it is also possible to have the RAM 23 used for storing some other data in the first to tenth memory areas in addition to the data of the colors of coating and the positions concerning the vehicle bodies 2 on the car type conveyers 10B to 19B, and to cause those other data to affect the first or second assortment of the vehicle bodies 2 by the colors of coating expected thereon.

In the example of the vehicle body coating line shown in FIG. 1, the embodiment of the present invention is applied to the process 34 of assortment by colors of coating, which is provided between the second coating and baking process 33 and the final coating and baking process 35. However, the arrangement according to the present invention, which is embodied as described above by way of example, is not limited in such an application and may be applied to the vehicle body coating line in a different manner.

Figure 7:
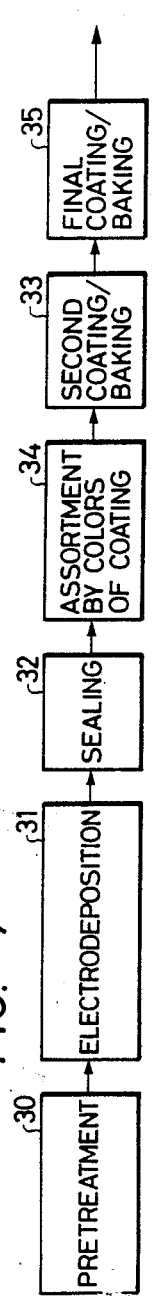
FIG. 7 is a block diagram showing a series of various principal processes in another vehicle body coating line to which an embodiment of the present invention is applied.

In this connection, FIG. 7 shows another vehicle body coating line in which a process 34 of assortment by colors of coating, to which the arrangement according to the present invention is applied, is provided between a sealing process 32 and a second coating and baking process 33. In the vehicle body coating line shown in FIG. 7, a pretreatment process 30, an electrodeposition process 31 and the sealing process 32 are provided in the same manner as those in the vehicle body coating line shown in FIG. 1, but the second coating and baking process 33 is so arranged that vehicle bodies from the sealing process 32 are successively coated in their respective colors, and a final coating and baking process 35 is provided for giving each of the vehicle bodies from the second coating and baking process 33 a final coating which causes the color deposited previously on the vehicle body to remain.

What is claimed is:

1. A method for sorting vehicle bodies by colors of coating expected thereon in a vehicle body coating line by utilizing an arrangement including a vehicle body conveying means having (a) bringing in conveying means for carrying vehicle bodies in the arrangement, (b) a plurality of branch conveying means disposed in parallel with one another for transporting and storing temporarily the vehicle bodies carried into the arrangement by said brining-in conveying means, and (c) a brining-out conveying means for supplying the vehicle bodies transported thereto from said plurality of branch conveying means to a coating process provided in the vehicle body coating lines, said method comprising the steps of:

storing data representing the color of coating expected at least on each of the vehicle bodies stored temporarily on said plurality of branch conveying means; and driving each of said plurality of branch conveying means selectively in accordance with the stored data so as to transport the vehicle bodies stored temporarily on said plurality of branch conveying means to said bringing-out conveying means in such a manner that the vehicle bodies from said plurality of branch conveying means are sorted in dependence on the colors of coating expected thereon to form groups of vehicle bodies on the brining-out conveying means which are to be coated in the same color.

2. A method as in claim 1 where said storing step includes storing said data with reference to the position of each vehicle body on said plurality of branch conveying means.

3. A method as in claim 1 where the order of the occurrence of the vehicle bodies on the brining-in conveying means is maintained within each color group formed on the brining-out conveying means in response to the stored data.

4. A method according to claim 1 where said selective driving of said plurality of branch conveying means selects the vehicle bodies which are to be coated in the same color from the vehicle bodies stored respectively at output end portions of said plurality of branch conveying means and transports the selected vehicle bodies to said bringing-out conveying means.

5. A method according to claim 4 where said plurality of branch conveying means respectively correspond to the m lines of an m x n matrix of vehicle body positions and said output end portions of said plurality of branch conveying means correspond to the first column of the matrix and the succeeding n-1 columns of the matrix respectively correspond to successive vehicle body positions on each of the plurality of branch conveying means.

6. A method as in claim 5 where said selective driving of said plurality of branch conveying means includes selecting said vehicle bodies which are to be coated with the same color from those positions of the first column of the matrix which contain the aforesaid vehicle bodies.

7. A method as in claim 6 where the selected vehicles are sequentially transported to the bringing-out conveying means in an order corresponding to the order of the lines where the order of the lines commences with the first line and proceeds to the $m^{th}$ line.

8. A method as in claim 7 where said vehicle bodies are positioned within said first column of said matrix in the order in which they occur on said bringing-in conveying means.

9. A method as in claim 6 where, subsequent to the transfer of the selected vehicle bodies from the first column of the matrix, said selective driving of the plurality of branch conveying means includes further selecting from the second column of the matrix those vehicle bodies with said same expected color which are in a line from which a vehicle body with said same expected color was selected from said first column.

10. A method as in claim 9 where the selected vehicles from the second column are sequentially transported to the brining-out conveying means in an order corresponding to the order of the lines where the order of the lines commences with the first line and proceeds to the $m^{th}$ line.

11. A method as in claim 10 where said vehicle bodies are positioned within said second column of said matrix in the order in which they occur on said bringing-in conveying means.

12. A method according to claim 1 including supplying said vehicle bodies from the brining-in conveying means to said plurality of branch conveying means, in response to the stored data, so that a plurality of vehicle bodies which are to be coated in the same color are formed as a group on at least one of said plurality of branch conveying means.

13. A method as in claim 12 where the probability of forming said group of vehicle bodies on said one branch conveying means is the same as that for forming the group on any of the other branch conveying means.

14. A method according to claim 1 where said plurality of branch conveying means respectively correspond to the m lines of an m x n matrix of vehicle body positions and successive vehicle body positions on each of said plurality of branch conveying means respectively correspond to the columns of the matrix.

15. A method according to claim 14 including supplying said vehicle bodies from the brining-in conveying means, in response to said stored data, to position one of said vehicle bodies to be coated in said same color in one of the columns of the matrix so as to follow another one of the vehicle bodies to be coated in said same color previously positioned in said one column.

16. A method according to claim 15 including, subsequent to said vehicle bodies being transferred to said one column of the matrix from the brining-in conveying means, further supplying vehicle bodies from the brining-in conveying means to position a further one of said vehicle bodies to be coated in said same color in a further column of the matrix adjacent to and following said one column, said further one vehicle body being positioned in said further column on a line on which said one or said another vehicle body had been positioned in said one column.

17. A method as in claim 14 including supplying said vehicle bodies from the brining-in conveying means to the plurality of branch conveying means in an order corresponding to the order of the lines where the order of the lines commences with the first line and proceeds to the $m^{th}$ line.

* * * * *